United States Patent
Liu

(10) Patent No.: US 7,667,990 B2
(45) Date of Patent: Feb. 23, 2010

(54) ARCHITECTURE FOR SWITCHING ON AND OFF POWER

(75) Inventor: Che-Chia Liu, Taipei Hsien (TW)

(73) Assignee: Andyson International Co., Ltd., Taipei Hsien (TW)

( * ) Notice: Subject to any disclaimer, the term of this patent is extended or adjusted under 35 U.S.C. 154(b) by 309 days.

(21) Appl. No.: 11/905,572

(22) Filed: Oct. 2, 2007

(65) Prior Publication Data

US 2009/0086516 A1  Apr. 2, 2009

(51) Int. Cl.
H02M 3/24   (2006.01)
H02M 5/42   (2006.01)
H02M 3/335  (2006.01)

(52) U.S. Cl. .......................... 363/97; 363/55; 363/21.01
(58) Field of Classification Search .................... 363/20, 363/21.01, 55, 56.01, 95, 97
See application file for complete search history.

(56) References Cited

U.S. PATENT DOCUMENTS

| | | | |
|---|---|---|---|
| 6,775,156 B1 * | 8/2004 | Lin et al. ................. | 363/21.01 |
| 6,839,247 B1 * | 1/2005 | Yang et al. ................ | 363/21.11 |
| 7,224,589 B2 * | 5/2007 | Chou et al. ............... | 363/21.04 |
| 7,289,339 B2 * | 10/2007 | Chou et al. ............... | 363/21.07 |
| 7,324,354 B2 * | 1/2008 | Joshi et al. ..................... | 363/17 |
| 7,480,157 B1 * | 1/2009 | Soeng ..................... | 363/21.01 |
| 2009/0167199 A1 * | 7/2009 | Liang et al. .................. | 315/219 |

* cited by examiner

*Primary Examiner*—Bao Q Vu
(74) *Attorney, Agent, or Firm*—Muncy, Geissler, Olds & Lowe, PLLC

(57) ABSTRACT

An architecture for switching on and off power, which applies to a power supply has a power factor regulation unit, a primary power system, and a regular power system. The regular power system provides the primary power system with a regular power to start the primary power system. The regular power system includes: a voltage detection unit generating a driving signal signifying and a regular power output unit receiving the driving signal and outputting the regular power. The voltage detection unit connects with a logic signal switch. The logic signal switch controls the voltage detection unit to determine whether the driving signal is normally output to the regular power output unit or coercively interrupted. Thereby, the power supply can be coercively switched off. As the driving signal has a smaller current, the liability of electric shock is decreased, and the volume and cost of the logic signal switch is reduced.

7 Claims, 3 Drawing Sheets

ARCHITECTURE FOR SWITCHING ON AND OFF POWER

FIELD OF THE INVENTION

The present invention relates to an architecture for switching on and off power, particularly to a circuit for controlling the switching on and off of a power supply.

BACKGROUND OF THE INVENTION

With the development of various electronic devices, there are also many power supplies developed to provide reliable power for electronic devices. Refer to FIG. 1 for a conventional power supply. The power supply has a switch unit 5, a rectifier unit 1, and a power factor regulation unit 2. The rear side of the power factor regulation unit 2 is coupled to a primary power system and a regular power system. When the switch unit 5 is turned on, an input power will enter the power supply and pass through the rectifier unit 1 and the power factor regulation unit 2. The power factor regulation unit 2 modulates the current phase of the input power and provides the power for the primary power system and the regular power system. The primary power system includes: a primary pulse modulation unit 31, a transformer unit 32 and a rectification/output unit 33. The turn-on/turn-off of the primary pulse modulation unit 31 is controlled by the regular power system. The regular power system includes: a voltage-detection unit 41, a regular power output unit 42, a power administration unit 43 and a far-end start switch 6. When a user triggers the far-end start switch 6, the power administration unit 43 generates a far-end start signal (Vcc) to drive the primary pulse modulation unit 31 to make the primary power system output power. In the conventional technology, the switch unit 5 must be turned on before the power supply obtains the input power. The switch unit 5 may be a single throw switch or a double throw switch. With the persistently rising output of a power supply, the switch unit 5 has to withstand higher and higher current. Thus, the switch unit will have a larger volume and a higher cost. Further, with the rising current, the switch unit 5 may generate sparks during switching. Under an environment of high humidity, or with a wet hand, a user touching the switch unit 5 may get an electric shock. Therefore, the switch unit 5 should be improved to solve the abovementioned problems.

SUMMARY OF THE INVENTION

The primary objective of the present invention is to provide an architecture for switching on and off power, which can control the power source of the power supply, has a small volume and a low cost and protects a user from an electric shock during switching on or off a great current power.

The present invention proposes an architecture for switching on and off power, which applies to a power supply having a primary power system and a regular power system. The regular power system includes: a voltage detection unit setting a normal voltage range; a regular power output unit, a power administration unit, and a far-end start switch. The voltage detection unit acquires an input power and generates a driving signal signifying that the input power is within the normal voltage range. The regular power output unit acquires the input power and the driving signal and outputs a regular power. The power administration unit acquires the regular power. After the far-end start switch is triggered, the power administration unit outputs a far-end start signal to start the primary power system to output power. The voltage detection unit is also connected to a logic signal switch. The logic signal switch determines whether the voltage detection unit normally outputs the driving signal or stops outputting the driving signal to the regular power output unit. Thereby, the regular power system and the primary power system can be shut down coercively. As the driving signal has a smaller current, the logic signal switch withstands less current. Thus, the liability of electric shock is decreased, and the volume and cost of the logic signal switch is reduced.

DETAILED DESCRIPTION OF THE PREFERRED EMBODIMENTS

The technical contents of the present invention will be described in detail in cooperation with the drawings below.

Figure 1:
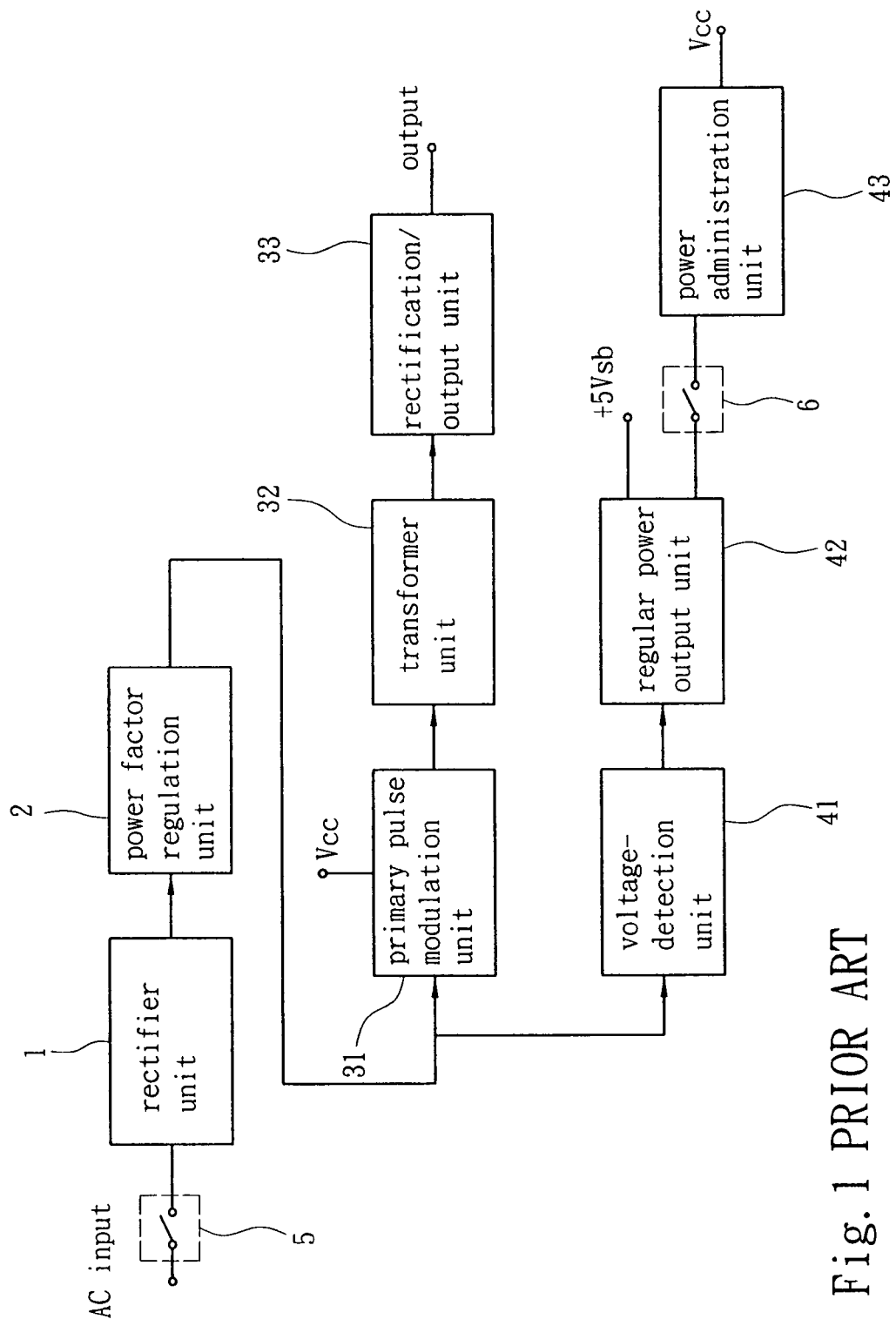
FIG. 1 is a block diagram showing the architecture of a conventional power supply.
Figure 2:
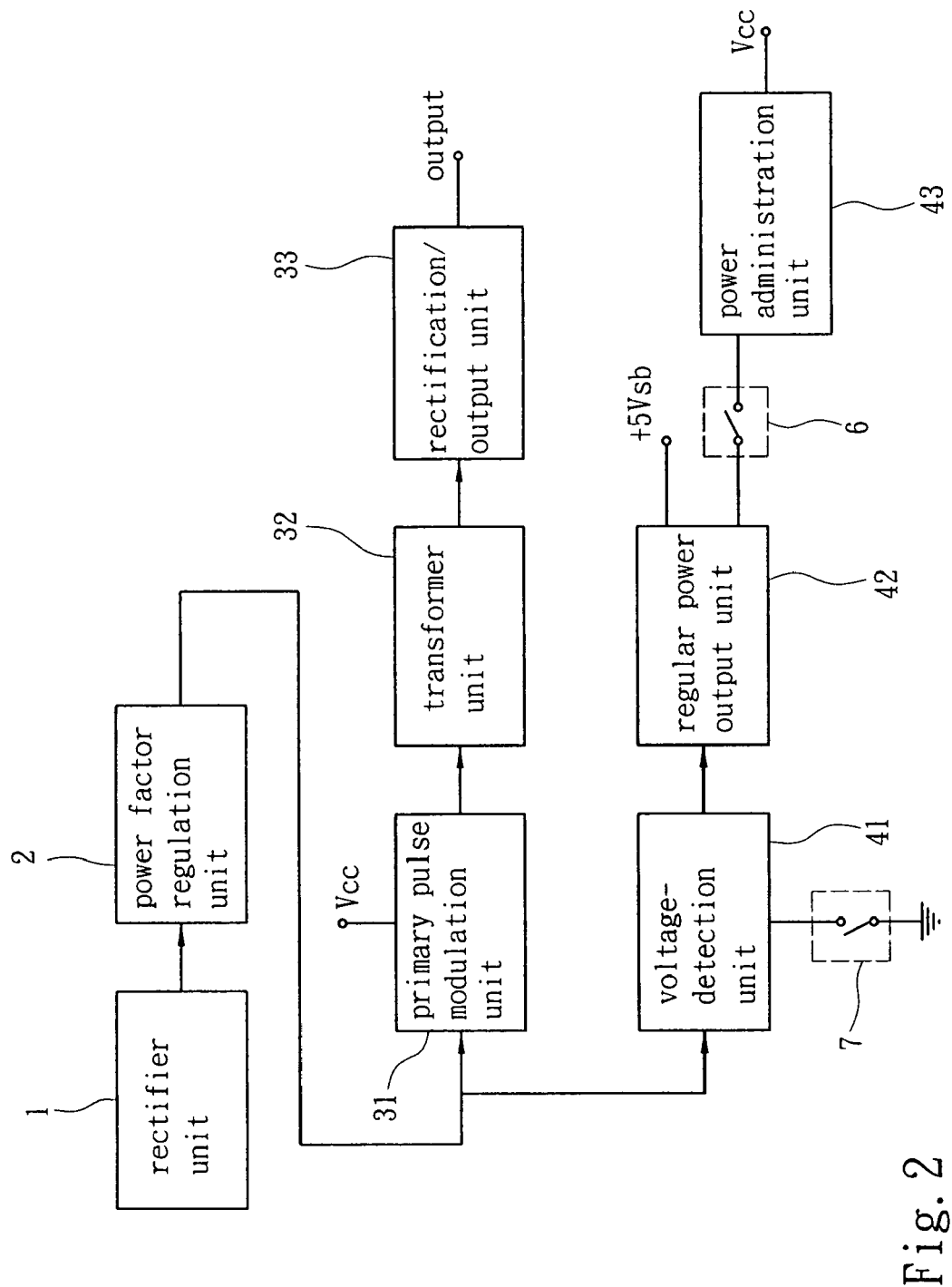
FIG. 2 is a block diagram showing the architecture according to the present invention.

Refer to FIG. 2 a block diagram showing the architecture according to the present invention. The present invention proposes an architecture for switching on and off power, which applies to a power supply having a primary power system and a regular power system. The power supply includes: a rectifier unit 1 used to acquire an input power and a power factor regulation unit 2 used to modulate the current phase of the input power. The input current is processed by the power factor regulation unit 2 and transferred to the primary power system and the regular power system. Thereby, the power supply can perform power conversion to output a primary power and a regular power. The primary power system includes: a primary pulse modulation unit 31, a transformer unit 32 and a rectification/output unit 33. The primary pulse modulation unit 31 receives a far-end start signal (Vcc) and then outputs a first periodic signal to adjust the conversion power output by the transformer unit 32. Then, the rectification/output unit 33 processes and outputs the power to drive loads. The regular power system includes: a voltage detection unit 41, a regular power output unit 42, a far-end start switch 6 and a power administration unit 43. The voltage detection unit 41 acquires the input power and determines whether the voltage of the input power is within the normal voltage range set by the voltage detection unit 41. If the voltage of the input power is within the normal voltage range, the voltage detection unit 41 generates a driving signal. The regular power output unit 42 receives the input power and is triggered by the driving signal to transform the input power into a regular power and then outputs the regular power. The far-end start switch 6 is normally off. After a user turns on the far-end start switch 6, the turn-on of the far-end start switch 6 makes the power administration unit 43 obtain the regular power and output the far-end start signal (Vcc) to the primary pulse modulation unit 31 of the primary power system. Then, the primary pulse modulation unit 31 generates the first periodic signal to start the primary system to output power. The present invention also has a logic signal switch 7. The logic signal switch 7 switches to determine whether the driving signal is transferred to the regular power output unit 42 or interrupted coercively. The logic signal switch 7 can control the voltage detection unit 41 to coercively interrupt the driving signal. When the logic signal switch 7 coercively interrupts the output of the driving signal, the regular power output unit 42 cannot output the regular power any more. In such a case, although the far-end start switch 6 is triggered, the power administration unit 43 still cannot output the far-end start signal (Vcc). Thereby, the regular power system and the primary power system cannot start. Thus, the power supply is switched on or off. The driving signal is a logic signal having a lower voltage and a smaller current. Therefore, the liability of electric shock is reduced. If there is indeed an electric shock, the harm will be smaller. Further, a small-size switch element is enough to realize the logic signal switch 7 and continue/interrupt the logic signal. Therefore, the present invention can achieve the objectives of promoting safety, decreasing volume and reducing cost.

Figure 3:
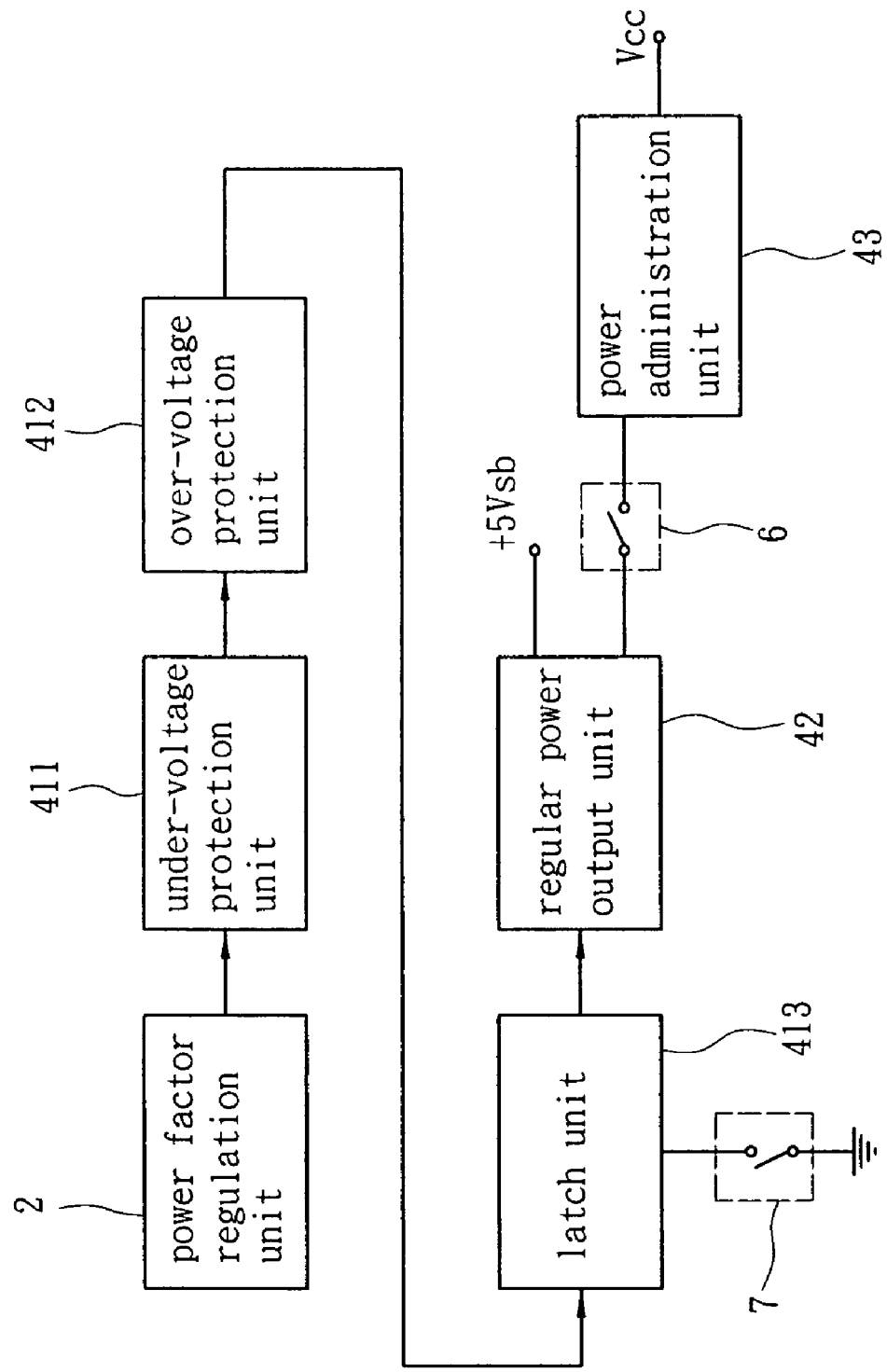
FIG. 3 is a block diagram showing the detailed architecture according to the present invention.

Refer to FIG. 3 a block diagram showing the detailed architecture according to the present invention. The voltage detection unit 41 may includes: an under-voltage protection unit 411, an over-voltage protection unit 412 and a latch unit 413. The under-voltage protection unit 411 and over-voltage protection unit 412 respectively has a lower voltage limit and an upper voltage limit, and both limits form a normal voltage range. When the input power exceeds the normal voltage range, the under-voltage protection unit 411 or over-voltage protection unit 412 will be triggered to block the input power. When the input power is within the normal voltage range, the input power will pass through the under-voltage protection unit 411 and over-voltage protection unit 412 and make the latch unit 413 latch a potential to form the driving signal and start the regular power output unit 42. Then, via the turn-on of the far-end start switch 6, the power administration unit 43 acquires the regular power and generates the far-end start signal (Vcc). A first end of the logic signal switch 7 is connected to the latch unit 413, and a second end of the logic signal switch 7 is connected to a ground terminal. Via enabling the conduction path between the latch unit 413 and the ground terminal, the logic signal switch 7 can guide the driving signal latched by the latch unit 413 to the ground terminal. Thereby, outputting the driving signal to the regular power output unit 42 is coercively interrupted, and the power supply is shut down. The driving signal conducted or interrupted by the logic signal switch 7 has voltage and current much smaller than that of the input power. Therefore, the logic signal switch 7 can have a smaller volume and a lower cost. Further, the present invention is less likely to generate sparks and thus can reduce the liability of electric shock.

Alternatively, the first end of the logic signal switch 7 is connected to the latch unit 413 of the voltage detection unit 41, and the second end of the logic signal switch 7 is connected to the regular power output unit 42. The switching of the logic signal switch 7 can directly continue or interrupt the conduction path of the driving signal to the regular power output unit 42. The regular power output unit 42 may further comprise: a secondary pulse modulation unit (not shown in the drawings) generating a second periodic signal and a regular transformer unit (not shown in the drawings) receiving the second periodic signal to adjust the output power, wherein the driving signal controls the operation of the secondary pulse modulation unit to determine whether the regular power output unit 42 outputs power. The logic signal switch 7 may be installed on the casing of the power supply to convenience the operation of users.

The preferred embodiments described above are only to demonstrate the present invention but not to limit the scope of the present invention. The scope of the present invention is based on the claims stated below. Any equivalent modification or variation made by the persons skilled in the art according to the spirit of the present invention is to be also included within the scope of the present invention.

In conclusion, the improvements of the present invention have been described above, and it proves that the present invention indeed possesses novelty and non-obviousness and meets the conditions for a patent. Thus, the Inventors file the application for a patent. It will be appreciated that the patent of the present invention is approved fast.

What is claimed is:

1. An architecture for switching on and off power, which is a circuit architecture to control the switching-on and-off of a power supply that has a primary power system acquiring an input power and a regular power system also acquiring said input power, characterized in that said regular power system comprises:

a voltage detection unit setting a normal voltage range and generating a driving signal signifying that said input power is within said normal voltage range;

a regular power output unit acquiring said input power and said driving signal and performing power conversion to output a regular power;

a far-end start switch and a power administration unit triggered by said far-end start switch to acquire said regular power and output a far-end start signal to start said primary power system to output power; and a logic signal switch connected to said voltage detection unit and switching to determine whether said driving signal is transferred to said regular power output unit or coercively interrupted.

2. The architecture for switching on and off power according to claim 1, wherein said primary power system includes:

a primary pulse modulation unit started by said far-end start signal and outputting a first periodic signal;

a transformer unit receiving said first periodic signal to adjust output power; and a rectification/output unit connected to said transformer unit.

3. The architecture for switching on and off power according to claim 1, wherein said voltage detection unit further comprises:

an under-voltage protection unit setting a lower voltage limit for said normal voltage range;

an over-voltage protection unit setting an upper voltage limit for said normal voltage range; and a latch unit outputting a driving signal when said input power is within said normal voltage range.

4. The architecture for switching on and off power according to claim 3, wherein said latch unit is connected to a first end of said logic signal switch, and a second end of said logic signal switch is connected to a ground terminal.

5. The architecture for switching on and off power according to claim 3, wherein said latch unit is connected to a first end of said logic signal switch, and a second end of said logic signal switch is connected to said regular power output unit.

6. The architecture for switching on and off power according to claim 1, wherein said regular power output unit further comprises:

a secondary pulse modulation unit triggered by said driving signal to generate a second periodic signal; and a regular transformer unit receiving said second periodic signal to adjust said regular power.

7. The architecture for switching on and off power according to claim 1, wherein said logic signal switch is installed on the casing of said power supply.

* * * * *